United States Patent
binti Kassim Shaari et al.

(10) Patent No.: US 8,404,904 B2
(45) Date of Patent: Mar. 26, 2013

(54) PROCESS FOR REDUCING COLOR OF A POLYGLYCEROL

(75) Inventors: Norin Zamiah binti Kassim Shaari, Kajang (MY); Tian Lye Ooi, Kajang (MY); Nik Siti Mariam binti Nek Mat Din, Kajang (MY); Salmiah Ahmad, Kajang (MY)

(73) Assignee: Malaysian Palm Oil Board, Selangor (MY)

( * ) Notice: Subject to any disclaimer, the term of this patent is extended or adjusted under 35 U.S.C. 154(b) by 463 days.

(21) Appl. No.: 12/390,311

(22) Filed: Feb. 20, 2009

(65) Prior Publication Data
US 2009/0215957 A1 Aug. 27, 2009

(30) Foreign Application Priority Data
Feb. 21, 2008 (MY) .............................. PI 20080359

(51) Int. Cl.
C07C 41/38 (2006.01)
C07C 43/10 (2006.01)
C07C 43/11 (2006.01)

(52) U.S. Cl. .................... 568/679; 568/680; 568/699

(58) Field of Classification Search .................... None
See application file for complete search history.

(56) References Cited

U.S. PATENT DOCUMENTS

| 2,705,722 A | * | 4/1955 | Barsky ................... 554/182 |
| 3,637,774 A | * | 1/1972 | Babayan et al. ............. 521/172 |
| RE28,887 E | * | 6/1976 | Jack et al. ................. 162/66 |
| 4,551,561 A | * | 11/1985 | Stuhler ................... 568/619 |

FOREIGN PATENT DOCUMENTS

| WO | WO 95/16013 | * | 6/1995 |
| WO | WO 2007/049950 A2 | * | 5/2007 |

OTHER PUBLICATIONS

Tierney et al., Microwave Assisted Organic Synthesis, 2005, Chapters 5, 8 and 9.*

* cited by examiner

*Primary Examiner* — Rosalynd Keys
(74) *Attorney, Agent, or Firm* — Workman Nydegger

(57) ABSTRACT

The present invention relates to a process for reducing color of a polyglycerol. The process includes the steps of treating said polyglycerol with a first bleaching agent such as bleaching earth and treating said treated polyglycerol with a second bleaching agent such as hydrogen peroxide.

20 Claims, No Drawings

PROCESS FOR REDUCING COLOR OF A POLYGLYCEROL

FIELD OF INVENTION

The present invention relates to a process for reducing color of a polyglycerol.

BACKGROUND OF INVENTION

Polyglycerols are widely used in food and cosmetic industry. Generally, polyglycerols produced at elevated temperature (250-270° C.) are highly colored and due to aesthetic reasons, polyglycerols require color reduction treatment before they can be used.

Conventional methods of reducing color in polyglycerols are by adsorption of the color producing substances on an adsorbent material. Acid-activated bleaching earth or clay, sometimes called bentonite, is the adsorbent material that has been used most extensively. This substance consists primarily of hydrated aluminum silicate. Anhydrous silica gel and activated carbon are also used as a reducing color adsorbent to a limited extent.

However, this adsorbent adsorbs and traps within itself a weight of oil approximately equal to its own weight. Thus, a higher volume of adsorbent is required during the reducing color operation. Further, more oils have to be reclaimed from the spent adsorbent or are lost from processing stream in spent adsorbent, which is discarded. Hence, a process which requires less amount of adsorbent and which increases adsorbent usage efficiency, are highly desirable.

SUMMARY OF INVENTION

Accordingly, the present invention provides a process for reducing color of a polyglycerol, the process including treating said polyglycerol with bleaching earth and treating said treated polyglycerol with hydrogen peroxide.

The present invention consists of several novel features and a combination of parts hereinafter fully described and illustrated in the description, it being understood that various changes in the details may be made without departing from the scope of the invention or sacrificing any of the advantages of the present invention.

DETAILED DESCRIPTION OF THE PREFERRED EMBODIMENTS

The present invention relates to a process for reducing color of a polyglycerol. Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

The process of the present invention can be utilized to reduce color of a polyglycerol obtained from a particular process. However, it can also be used to reduce color of any readily available polyglycerols such as crude polyglycerols.

Preparation of the polyglycerol of the present invention is formed from polymerization reaction of the glycerol. The polymerization of the glycerol is conducted in a microwave oven preferably with presence of catalyst. A catalyst is used in the present invention to increase the yield of the desired polyglycerol. Catalyst used in the present invention is selected from potassium acetate, sodium acetate anhydrous, sodium acetate trihydrate, sodium formate, tri-sodium citrate, potassium citrate or any catalysts alike. It is preferably about 0.5 to 10 weight percent and more preferably 0.5 to 1.0 percent of catalyst are employed based on the weight of glycerol in preparation of polyglycerol of the present invention.

However, it must be appreciated that the polymerization of the glycerol can also be conducted without the presence of a catalyst.

The polymerization glycerol is heated at reaction temperature in the range of 200° C. to 310° C., but preferably in the range of 250° C. to 270° C. By employing temperatures in this range, it is possible to achieve good conversion into polyglycerol with minimal undesired side products. It is preferred that the process is conducted at atmospheric pressure.

The yield of the end products of the polymerization glycerol typically contains 78% to 85% of diglycerol and polyglycerol by weight of the glycerol. This yield can be ascertained by analysing the end products after the polymerization of the glycerol with High Performance Liquid Chromatography (HPLC). The following is a typical composition percentage of the glycerol polymers analyzed through HPLC.

Typical composition of glycerol polymers:
(a) 15% to 20% of unreacted glycerol;
(b) 25% to 30% of diglycerol;
(c) 20% to 25% of triglycerol;
(d) 10% to 15% of tetraglycerol;
(e) 15% to 10% of pentaglycerol; and
(f) 1% to 5% of hexaglycerol.

From the HPLC chromatogram, there is little and no evidence of cyclic digylcerol or polyglycerol found in the end products when compared to standard polymers of glycerol. Therefore, preparation polyglycerol of the present invention selectively produces linear diglycerol and polyglycerol from glycerol.

The end products may be diluted with an equal amount of deionised water and is then subjected through a column of cationic ion exchanger such as Amberlite IR-120 to remove dissolved catalysts. The end product is further distilled to remove the excessive water.

Polyglycerol obtained from this process are then diluted and mixed with water at a weight ratio of 1:5 (polyglycerol to water) for the purpose of dissolving the polyglycerol.

At first stage, bleaching earth as a bleaching agent is added into the mixture at concentration of 10-50% preferably 50% (w/w) based on the weight of polyglycerol. The properties of the bleaching earth used in the present invention are shown in Table 1. The bleaching earth used in the present invention are a commercial grade. However, the present invention is not limited to bleaching earth, any equivalent adsorbent materials or the like are able to apply as a bleaching agent in the present invention.

TABLE 1

| Parameters | Results | Specification |
|---|---|---|
| Moisture content, % | 5.8 | 15 max |
| Hedley Acidity, % $H_2SO_4$ | 0.059 | 0.1 max |
| pH (2% Suspension) | 3.7 | 6.0 max |
| Activity vs Grade Standard, % | 110 | 90-110 |
| Apparent Bulk Density, $kg/m^3$ | 463 | 600 max |

The polyglycerol and the bleaching earth are mixed by stirring at 200 to 600 rpm preferably 600 rpm for a duration time of 30 minutes and at a reaction temperature ranging between 50° C. to 60° C. Subsequently, the well mixture having polyglycerol and bleaching earth is filtered to recover said treated polyglycerol from the spent bleaching earth. The treated polyglycerol is dried to remove any excess water in its content.

In second stage of the present invention, the treated polyglycerol obtained from the first stage is further bleached using hydrogen peroxide ($H_2O_2$) as a further bleaching agent. Hydrogen peroxide with 50% concentration is added into the mixture at concentration of 10% based on the weight of the treated polyglycerol. The mixture of the treated polyglycerol and hydrogen peroxide is then heated at a reaction temperature 50° C. to 60° C. This mixture is stirred at 200 to 600 rpm preferably 600 rpm for duration of 10 to 30 minutes preferably 15 minutes. The final treated polyglycerol is dried to remove any excess water in its content.

One of the advantages of the present invention is to produce light color or a substantially colorless polyglycerol for use as moisturizing agent in cosmetic and personal care products such as lotions, shampoo and many other varied applications. The other advantage of the present invention is that the duration of bleaching process of the present invention is shorter than the conventional method adsorption treatment.

In one embodiment, the polyglycerol can be obtained by reacting a glycerol in the presence of a catalyst at a temperature from 200° C. to 310° C., preferably 250° C. to about 270° C. for about 30 minutes by microwave irradiation. In another embodiment, bleaching of the polyglycerol with the said bleaching earth can be performed in a few steps before bleaching with the said hydrogen peroxide. In one embodiment, the final treated polyglycerol can have a color scale of about 0.8R or less.

The following example is intended to further illustrate the invention, without any intention for the invention to be limited to the specific embodiment described therein.

EXAMPLE 1

First Stage: Bleaching by Using Bleaching Earth 50 g of polyglycerol were weighed in a beaker. Then, 250 g of water were added to dissolve the polyglycerol. Next, 25 g of bleaching earth was added into the solution Then, the mixture was heated to 50° C. to 60° C. and stirred at 600 rpm for duration of 30 minutes. After that, the mixture was filtered to remove the spent bleaching earth. Then, the filtrate was dried until the moisture content approximately 0.1%. The color of the polyglycerol was then determined by using Lovibond Tintometer Model F.

Second Stage: Bleaching by Using Hydrogen Peroxide 50 g of the bleached polyglycerol (from first stage bleaching) were weighed in a beaker. Next, 5 g of hydrogen peroxide (50% concentration) were added into the mixture. Next, the mixture was heated to 50° C. and stirred at 600 rpm for duration 15 minutes. After that, the mixture was dried until moisture content approximately 0.1%. The color of the polyglycerol was determined by using Lovibond Tintometer Model F. A typical property of the polyglycerol at 1% dilution, which has been prepared from thermal dehydration of pure glycerol after the bleaching process of the present invention, is shown in Table 2.

TABLE 2

| Sample | Color before bleaching (1% dilution) | Color after bleaching (1% dilution) | |
|---|---|---|---|
| | | Bleaching earth | Hydrogen peroxide |
| Sample A | 10Y 1.1R | 1.2Y | 0.7Y |
| Sample B | 9Y 1.2R | 3Y 0.4R | 0.5Y 0.1R |
| Sample C | 0.5Y 0.1R | 1.0Y | 0.3Y |

Table 3 shows the color without dilution of polyglycerol, obtained from thermal dehydration of pure glycerol after the bleaching process of the present invention.

TABLE 3

| Sample | Color before bleaching | Color after bleaching |
|---|---|---|
| Sample E | 19.9Y 15.9R | 2.9Y 0.9R |
| Sample F | 15.9Y 13.9R | 1.7Y 0.7R |

Table 4 shows the color without dilution of polyglycerol, obtained from thermal dehydration of crude glycerol after the bleaching process of the present invention.

TABLE 4

| Sample | Color before bleaching | Color after bleaching |
|---|---|---|
| Sample G | 60Y 8R | 0.9Y |

The invention claimed is:

1. A process for reducing color of a polyglycerol, the process comprising:
    (a) treating said polyglycerol in an aqueous medium containing water with bleaching earth, wherein said bleaching earth is added to said aqueous medium at a concentration of 10% to 50% based on the weight of said polyglycerol;
    (b) removing said bleaching earth from said treated polyglycerol;
    (c) drying said treated polyglycerol from which said bleaching earth was removed to remove excess water; and
    (d) further bleaching said dried polyglycerol with hydrogen peroxide while heating.

2. The process as claimed in claim 1, wherein said polyglycerol is obtained by heating glycerol monomers with a catalyst using microwave irradiation.

3. The process as claimed in claim 1, wherein the polyglycerol is obtained by heating glycerol using microwave irradiation.

4. The process as claimed in claim 1, wherein said polyglycerol is obtained by reacting a glycerol in the presence of a catalyst at a temperature from 200° C. to 310° C. for 30 minutes by microwave irradiation.

5. The process as claimed in claim 4, wherein said catalyst is selected from potassium acetate, sodium acetate anhydrous, sodium acetate trihydrate, sodium formate, tri-sodium citrate, or potassium citrate.

6. The process as claimed in claim 5, wherein said catalyst is added in an amount of 0.5 to 10 weight percent to the weight of said glycerol.

7. The process as claimed in claim 1, wherein said bleaching earth is added to said polyglycerol at a concentration of 50% based on the weight of said polyglycerol.

8. The process as claimed in claim 7, wherein a mixture of said bleaching earth and said polyglycerol is heated at a reaction temperature of 50° C. to 60° C.

9. The process as claimed in claim 8, wherein said mixture is stirred at 600 rpm for a duration of 30 minutes.

10. The process as claimed in claim 9, wherein said mixture is filtered after said stifling to recover said treated polyglycerol from said bleaching earth.

11. The process as claimed in claim 10, wherein said further bleached polyglycerol is dried to remove excess water after being further bleached with hydrogen peroxide.

12. The process as claimed in claim 1, wherein said hydrogen peroxide has a concentration of 50% before being added to said treated polyglycerol.

13. The process as claimed in claim 12, wherein said hydrogen peroxide is added at concentration of 10% based on the weight of polyglycerol.

14. The process as claimed in claim 13, wherein said treated polyglycerol and said hydrogen peroxide are heated at reaction temperature 50° C. to 60° C.

15. The process as claimed in claim 14, wherein said treated polyglycerol and said hydrogen peroxide is stirred at 600 rpm for a duration of 15 minutes.

16. The process as claimed in claim 15, wherein a final treated polyglycerol is dried to remove the excess water.

17. The process as claimed in claim 1, said further bleached polyglycerol having a color scale of 0.8R or less.

18. The process as claimed in claim 1, wherein the polyglycerol is obtained by reacting a glycerol in the presence of a catalyst at a temperature from 250° C. to 270° C.

19. A process for reducing color of a polyglycerol, the process comprising:
(a) treating said polyglycerol in an aqueous medium with bleaching earth while heating to a temperature of 50° C. to 60° C., wherein said bleaching earth is added to said aqueous medium at a concentration of 10% to 50% based on the weight of said polyglycerol;
(b) removing said bleaching earth from said treated polyglycerol;
(c) drying said treated polyglycerol to remove excess water; and
(d) further bleaching said treated polyglycerol with hydrogen peroxide while heating to a temperature of 50° C. to 60° C. to yield polyglycerol with reduced color, wherein the polyglycerol of reduced color has a color scale of about 0.8R or less.

20. A process for reducing color of a polyglycerol, the process comprising:
(a) providing a polyglycerol obtained by reacting glycerol in the presence of a catalyst selected from potassium acetate, sodium acetate anhydrous, sodium acetate trihydrate, sodium formate, tri-sodium citrate, or potassium citrate and added in an amount of 0.5% to 10% by weight of said glycerol, said glycerol being reacted at a temperature from 200° C. to 310° C. by microwave irradiation;
(b) treating said polyglycerol in an aqueous medium with bleaching earth, wherein said bleaching earth is added to said aqueous medium at a concentration of 10% to 50% based on the weight of said polyglycerol;
(c) removing said bleaching earth from said treated polyglycerol;
(d) drying the said polyglycerol to remove excess water;
(e) further bleaching said dried treated polyglycerol while heating with hydrogen peroxide; and
(f) drying said further bleached polyglycerol to remove excess water.

* * * * *